June 30, 1925.  
J. J. PALOTCE  
MOTOR WRECKING TRUCK  
Filed Aug. 19, 1924  
1,544,477  
3 Sheets-Sheet 3

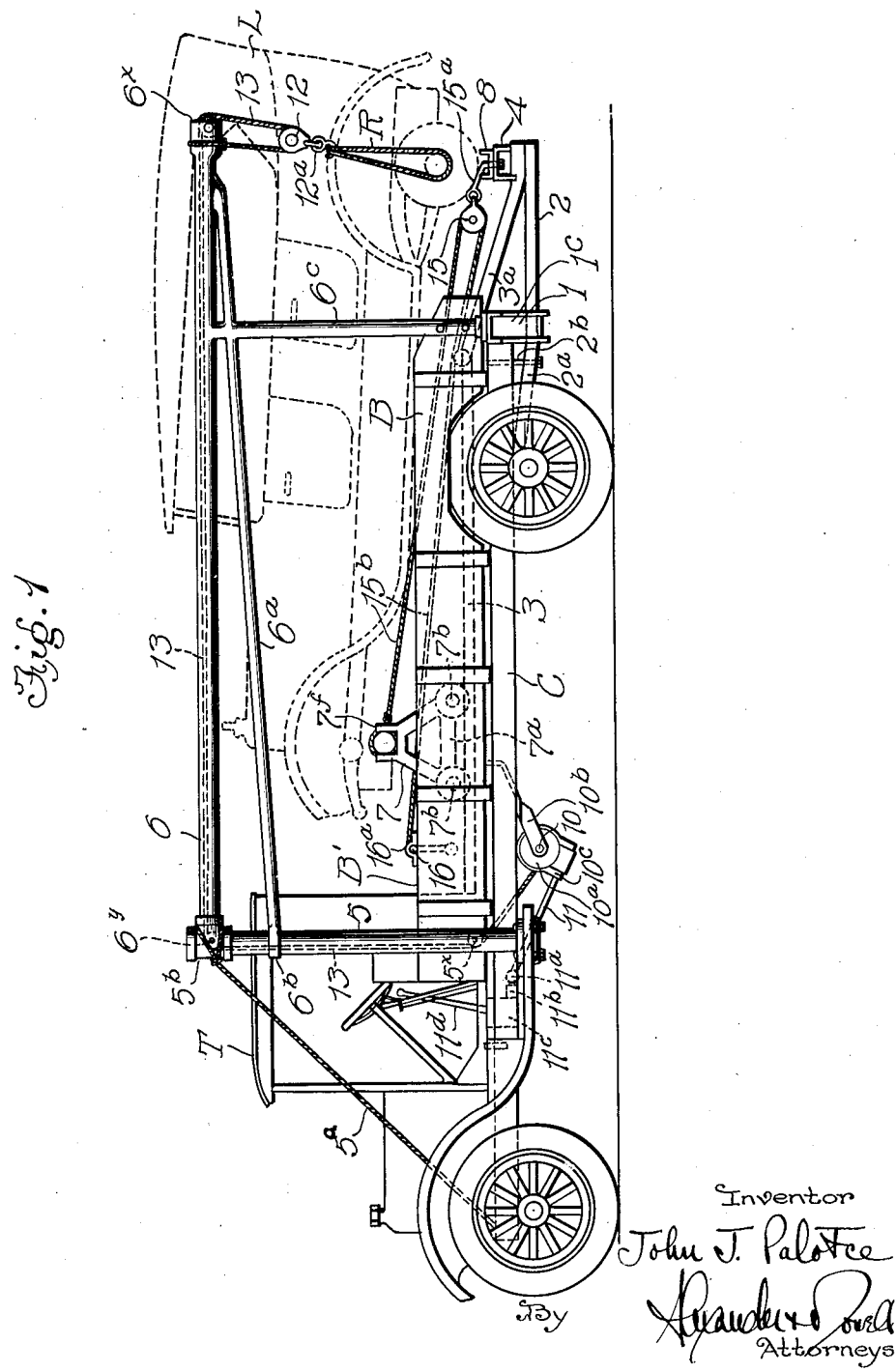

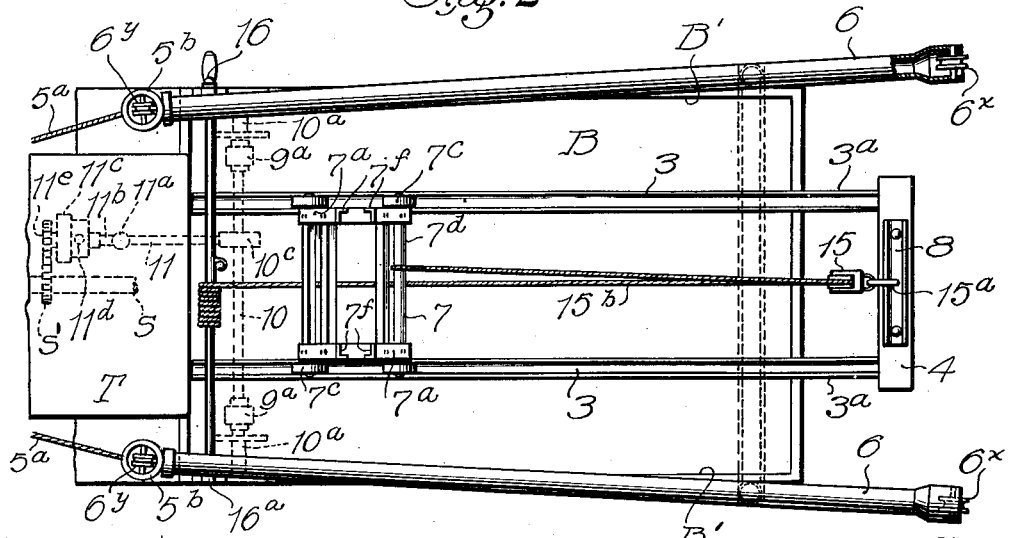

Inventor  
John J. Palotce  
By Alexander Powell  
Attorneys

Patented June 30, 1925.

1,544,477

UNITED STATES PATENT OFFICE.

JOHN J. PALOTCE, OF YOUNGSTOWN, OHIO.

MOTOR WRECKING TRUCK.

Application filed August 19, 1924. Serial No. 732,952.

*To all whom it may concern:*

Be it known that I, JOHN J. PALOTCE, a citizen of the United States, residing at Youngstown, in the county of Mahoning and State of Ohio, have invented certain new and useful Improvements in Motor Wrecking Trucks; and I hereby declare that the following is a full, clear, and exact description thereof, reference being had to the accompanying drawings, which form part of this specification.

This invention is a novel improvement in motor wrecking trucks, and the principal object thereof is to provide a simple, novel, and efficient motor wrecking truck, which will be capable of readily and easily hoisting a damaged automobile or other load, into the body of the truck, means being provided to retain the load therein; and will also be capable of readily and easily removing the damaged automobile, or other load, from the truck body after the truck has been run into a garage or repair shop, and then replacing the load upon the ground.

Heretofore it has been the practice to construct motor wrecking trucks with a single derrick or hoist mounted on the rear end of the truck body, which hoist is used to raise the front or rear end of a damaged motor vehicle, or other load, off the ground, and when so raised the trucks then pull the damaged motor vehicle into a garage or repair shop. It has been found that by so pulling the damaged vehicle additional injury thereto is caused, by reason of the unusual stresses in the vehicle body. By using my novel wrecking truck, however, the damaged vehicle may be hoisted into the body of the truck, and thus transported, without injury, to the garage or repair shop where the vehicle may be then replaced on the ground for repairs.

Another object of the invention is to provide a motor wrecking truck with novel horizontally pivoted booms, for raising a load, said booms being adapted to be readily swung to the side of the truck to raise a "side-load," thereby increasing the scope of its use, means being provided for bracing the outer ends of the booms in any positions to which the booms may be swung.

Other minor objects of the invention will be hereinafter set forth.

I will explain the invention with reference to the accompanying drawings which illustrate one practical embodiment thereof, to enable others to adopt and use the same, and will summarize in the claims the essential features of the invention, the novel features of construction, and novel combinations of parts, for which protection is desired.

In the drawings:

Figure 1 is a side elevation of my motor wrecking truck, showing in dotted lines a damaged motor vehicle raised into the body thereof.

Figure 2 is a top plan view thereof.

Figure 3 is an end elevation thereof, showing the booms swung slightly to the side of the car with the braces in operation.

Figure 4:
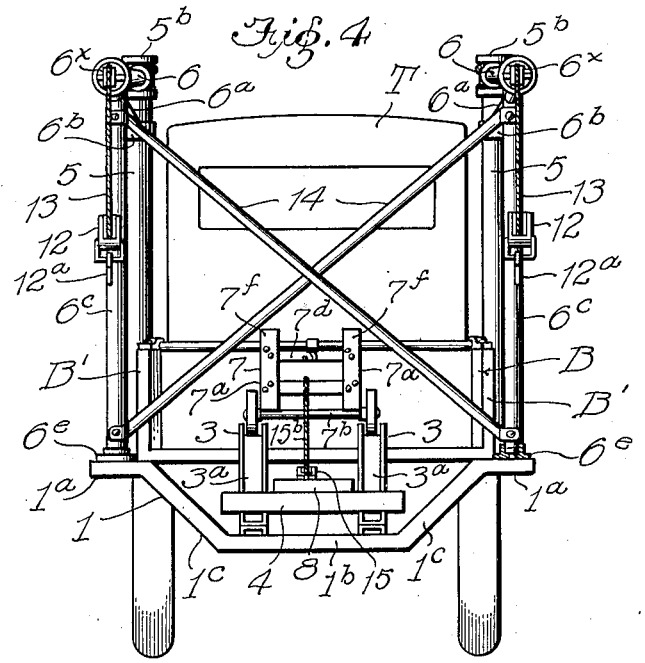
Figure 4 is an end view of the truck showing the additional braces for the booms when a side-pull is used.
Figure 5:
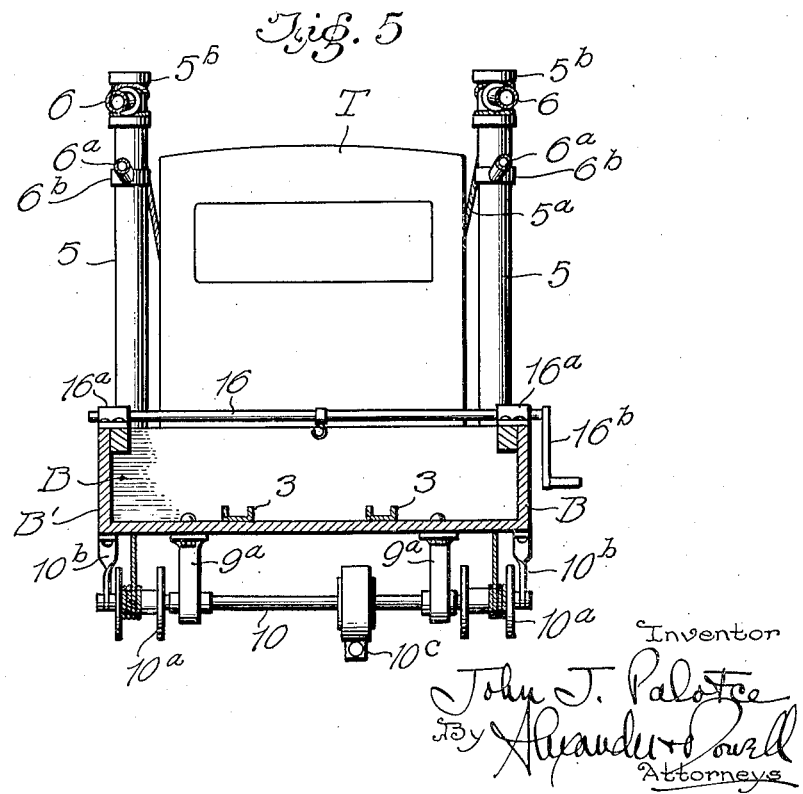
Figure 5 is a transverse section through the truck showing the arrangement of the drum shaft.

As shown in the drawings, my novel motor wrecking truck preferably comprises a motor vehicle chassis C of any desired form or type, upon which is mounted an open body B in rear of the top T covering the driver's seat, said body preferably being provided with low side members B' extending along the sides thereof in the usual manner.

The rear transverse member of the chassis C preferably comprises a channel iron 1, having its ends 1ᵃ preferably flush with the top of the chassis C as shown in Figs. 1, 3 and 4, and extending beyond the side members B, as at 1ᵃ. The middle portion 1ᵇ of the member 1 is preferably straight but is disposed below the plane of the ends 1ᵃ, the same being disposed approximately only half the height of the chassis above the ground, with the portions 1ᶜ of the channel 1 sloping downwardly and inwardly from the ends 1ᵃ to said middle portion 1ᵇ, whereby the channel member 1 is formed approximately V-shaped. The legs of the channel are preferably directed downward. Any other structural shape beam may be used in place of the channel iron, if desired.

Upon the middle portion 1ᵇ of the channel 1 at the sides thereof, are mounted in any desired manner two longitudinally disposed cantilever members 2, which are preferably H-beams, or double channel irons placed back to back, or may be any other desired structural shape, said members 2 being disposed parallel with the ground, and extending a desired distance beyond the end of the chassis C and the channel member 1. The inner ends 2ª of the members 2 are preferably bent slightly upwardly and secured to the under side of the chassis C and preferably further anchored in position by means of bolts 2ᵇ passing through the chassis frame as shown in Figure 1.

Extending longitudinally upon the body B, at the center thereof are tracks 3, preferably comprising channel irons having their legs upstanding, said tracks 3 are preferably disposed directly over the cantilever members 2. Tracks 3 are adapted to receive and guide a carriage 7 for supporting the front axle of the damaged vehicle L, or front end of any other load as will be hereinafter more fully explained. The outer ends of the tracks 3, beyond the body B are bent downwardly as at 3ª to meet the ends of the cantilever members 2, the outer ends of members 2 and tracks 3 are secured together preferably by means of a transverse channel member 4 securely bolted or riveted to the adjacent ends of said members 2 and 3 to hold the outer ends thereof in correct alignment, and whereby the carriage 7 may travel on the tracks 3 in the body B of the truck down the inclined portions 3ª substantially to the outer ends of member 2, at which point the carriage will be considerably lower than the body of the truck.

Mounted upon the chassis C, adjacent the front end of the body B, and at each side thereof, are standards 5, preferably tubular, and extending slightly above the top T. Standards 5 may be securely mounted upon the running boards of the chassis as shown in Figure 1, and are preferably braced by means of guy wires 5ª extending down to the front end of the chassis C.

Upon the upper ends of standards 5 are pivotally mounted, upon suitable collars, booms 6, which are likewise preferably tubular, said booms being of sufficient length to extend slightly beyond the rear end of the tracks 3, and the frame 4, as shown in Figure 1.

The booms 6 are preferably braced and normally held in horizontal position upon the standards 5, by means of brace rods 6ª, welded or otherwise securely attached to the booms 6 adjacent their outer ends, said rods 6ª extending downwardly and inwardly to the standards 5, on which the inner ends of said rods 6ª are pivoted, as at 6ᵇ, in any desired manner, so that the booms 6 may pivot freely upon the standards 5 but will be vertically braced in any position.

In order to support the other ends of booms 6 when a load is applied thereto, I provide uprights 6ᶜ, disposed directly above the ends 1ª of channel member 1, said uprights 6ᶜ being preferably tubular as shown in Figure 3, and are securely welded or otherwise attached at their upper ends to the booms 6 adjacent their other ends, and uprights 6ᶜ are preferably slightly shorter than the vertical distance from the booms 6 to the upper side of the ends 1ª of channel member 1 upon which the uprights 6ᶜ normally seat, as shown in Figures 1 and 4.

Within the lower ends of uprights 6ᶜ are rods 6ᵈ, making a sliding fit therein, said rods being of sufficient length to reach to the ground level, and are provided on their lower ends with enlarged base flanges 6ᵉ. Diametrically through the rods 6ᵈ and upright 6ᵉ are holes 6ᶠ adapted to receive pins for holding the rods 6ᵈ in extended or retracted position. Normally the rods 6ᵈ will be retracted so that the bases 6ᵉ thereof seat upon the extended ends 1ª of the channel member 1, but when the booms 6 are swung to the side of the truck to take a side load, the rods 6ᵈ may be extended, as shown in Figure 3, so that the bases 6ᵉ rest upon the ground, to support the outer ends of booms 6 in such position, the pins being inserted in the registering perforations 6ᶠ in the rods 6ᵈ and uprights 6ᶜ to maintain the rods 6ᵈ in such extended positions.

As shown, the carriage 7 preferably comprises parallel metallic end frames 7ª which are preferably triangular in shape, and provided with axle bearings at the lower corners thereof, adapted to receive the parallel axles 7ᵇ bearing the wheels 7ᶜ which run in the tracks 3, as shown. The end frames 7ª may be connected together by means of frame members 7ᵈ securely riveted to the frames 7ª adjacent their lower corners, and at the top of the triangular frames 7ª is a cross member or saddle 7ᵉ, upon which the front axle of the damaged vehicle is adapted to rest. The end frames 7ª have projections 7ᶠ which extend above the plane of the member 7ᵉ to form the saddle for the vehicle axle, and to prevent the axle drum slipping off the carriage. The height of the carriage 7 should be sufficient to hold the front wheels of the damaged vehicle off the floor boards of the body B, when placed therein.

Upon the top of the channel member 4 is placed a saddle member 8, preferably a channel iron, with legs thereof upstanding to receive the rear axle of the damaged vehicle or the differential casing thereof, when placed in the truck as shown in Figure 1.

Mounted in suitable bearing members 9ª, depending from the body B of the truck, adjacent the inner end thereof, is a shaft 10, disposed transversely of said body B, upon the outer ends of which shaft are mounted drums 10ª, in alignment with the standards 5, for the purpose hereinafter described. The outer ends of the shaft 10, beyond the drums 10ª may be further supported by means of members 10ᵇ as shown.

Upon the shaft 10 is mounted a worm gear which may be housed in a suitable casing 10ᶜ, and into the casing 10ᶜ extends a shaft 11 carrying a worm on its outer end meshing with the worm gear. Shaft 11 is connected through a universal joint 11ᵃ, to a counter shaft 11ᵇ, having a clutch 11ᶜ connected therein, and controlled by means of a lever 11ᵈ, said counter shaft having a chain sprocket, or pinion 11ᵉ mounted on its outer end. Upon the main drive shaft S of the truck is a chain sprocket or pinion S' opposite the sprocket 11ᵉ, and a chain may be passed around the sprockets 11ᵉ, S', to drive the shafts 11ᵇ, and 11 thereby imparting rotation to the drive shaft 10 when the lever 11ᵈ is thrown to engage the members of the clutch 11ᶜ.

At the outer ends of booms 6 are supported blocks 12 having hooks 12ᵃ depending therefrom, said blocks 12 being supported by means of cables 13 having one end tied or otherwise secured to the booms 6, and passing down under the block sheave, and up over pulleys 6ˣ journaled in the ends of tubular booms 6. Cables 13 are passed through the booms 6 and over pulleys 6ʸ journalled in the inner ends of booms 6 directly over the tubular supports 5. Cables 13 are further passed down through the supports 5 and under pulleys 5ˣ journaled within the supports 5, and out through openings in the sides of said supports, to and around the drums 10ᵃ on shaft 10. Hence as shaft 10 is revolved, the blocks 12 will be raised or lowered, and the above arrangement of the cables 13 permits the same to be operated regardless of the position of the booms upon the supports 5.

As shown in Figure 4, when it is desired to use a side-pull, the booms 6 are swung to their normal position, and the uprights 6ᶜ supported upon the outer ends 1ᵃ of channel member 1. I also provide angularly disposed cross braces 14 which may be detachably fastened to the tops of their respective uprights 6ᶜ and to the lower ends of the opposite uprights 6ᶜ to maintain the booms in parallel relation thereby permitting a greater side pull by the booms. Ordinarily the cross braces 14 would be removed from the booms so as not to interfere with the loading of a damaged vehicle into the body of the truck.

Secured to the members 4 and 8 by means of a bolt 15ᵃ, is a block 15, around which passes a cable 15ᵇ, having one end adapted to be tied to the carriage 7, or to the front axle of the damaged vehicle on the truck, as shown in Figures 1 and 2 and the other end wrapped around a shaft 16 suitably journalled in bearings 16ᵃ mounted upon the sides B' of the body, said shaft 16 having an arm 16ᵇ on one end thereof whereof the shaft may be rotated to wind up the cable 15ᵇ, and thus draw the vehicle towards the rear end of the truck when it is desired to remove the vehicle from the truck.

*Operation.*

When it is desired to hoist a damaged vehicle into the truck body, the motor truck is first backed up to, and in line with, the front end of the damaged vehicle. The carriage 7 is then run out to the outer ends of the tracks 3 where it is retained by reason of the inclination of the portions 3ᵃ of the tracks. The blocks 12 are then simultaneously lowered, with the booms 6 in their normal position, supported by the uprights 6ᶜ resting upon the ends 1ᵃ of channel 1. Suitable slings R are then passed under the ends of the front axle of the damaged vehicle L, and the clutch 11ᵈ is then thrown to drive the drum shaft 10 from the main drive shaft S of the truck, and the blocks 12 are thereby simultaneously raised, lifting the front end of the damaged vehicle into the saddle of the carriage 7. The slings R are then removed from the front axle, and are then passed under the rear axle of the damaged vehicle and engaged with the blocks 12; which are simultaneously raised thereby lifting and pulling the vehicle towards the truck, until its rear axle, or differential casing, rests upon the saddle 8 as shown in Figure 1. As the vehicle is thus pulled towards the truck, the carriage 7 supporting the front end of the vehicle travels in tracks 3 towards the inner end of the body B. Slings R are preferably retained under the rear axles of the vehicle after seating same in place upon the truck, as a safeguard in case the rear end of the vehicle should slip out of the trough 8, and also holding the vehicle upright on the truck. The damaged vehicle thus loaded on the truck may be bodily carried without injury, to a garage or repair shop.

When it is desired to remove the vehicle from the truck, the blocks 12 are then raised to lift the rear axle of the vehicle out of the saddle 8. One end of cable 15ᵇ is then tied to the carriage 7, or around the front axle of the vehicle and the shaft 16 rotated, by means of handle 16ᵇ, thereby pulling the vehicle back out of the truck. The blocks 12 may be simultaneously lowered while winding up the shaft 16 until the rear end of the vehicle rests on the ground, and the carriage 7 has reached the outer end of tracks 3. Sling R and blocks 12 may then be used to lift the front axle of the vehicle out of the carriage saddle, and replace the front end of the vehicle upon the ground.

My novel motor wrecking truck is simple in construction and operation, will lift a damaged vehicle into and out of the truck body; and the booms, when swung to the side of the truck and supported by the extensible uprights 6ᶜ, will lift a side load; also by using cross-braces 14, a side pull by the booms may be made without injury to the truck or booms.

I claim:

1. A wrecking truck, comprising the combination of a motor vehicle chassis; a standard mounted thereon; a boom horizontally pivoted on said standard; extensible means for supporting the outer end of said boom in any position; a block suspended from the outer end of said boom; means for raising and lowering said block; a track on said chassis extending beyond the rear end thereof; and a carriage movable on said track for the purpose specified.

2. In a truck as set forth in claim 1, a pulley connected to the end of said track; a transversely disposed shaft journaled in the chassis; a hand lever for rotating said shaft; and a cable passing around said pulley and having one end thereof attached to said carriage and the other end wrapped around said shaft, whereby as the shaft is rotated the carriage will be drawn towards the rear end of the track.

3. A wrecking truck, comprising the combination of a motor vehicle chassis; a plurality of standards mounted thereon; horizontally disposed booms pivotally mounted on said standards; extensible means for supporting the outer ends of said booms in any position; blocks suspended from the outer ends of said booms; means for raising and lowering said blocks; a track disposed on the longitudinal axis of said chassis and extending beyond the rear end thereof; and a carriage movable on said track, for the purpose specified.

4. In a truck as set forth in claim 3, a pulley connected to the ends of said track; a transversely disposed shaft journaled in the chassis; a hand lever for rotating said shaft; and a cable passing around said pulley and having one end thereof attached to said carriage and the other end wrapped around said shaft, whereby as the latter is rotated the carriage will be drawn towards the rear end of the track.

5. A wrecking truck, comprising the combination of a motor vehicle chassis, an open body mounted thereon; standards mounted on opposite sides of said body; horizontally disposed booms pivotally mounted on said standards; extensible means for supporting the outer ends of said booms in any adjusted position; blocks suspended from the outer ends of said booms; means for raising and lowering said blocks; a track on the longitudinal axis of said body extending beyond the rear end thereof; said tracks beyond said body sloping downwardly and rearwardly; and a carriage movable on said track for the purpose specified.

6. In a truck as set forth in claim 5, a pulley connected to the ends of said track; a transversely disposed shaft journaled on the truck body, a hand lever for rotating said shaft; and a cable passing around said pulley and having one end thereof attached to said carriage and the other end wrapped around said shaft, whereby as the latter is rotated the carriage will be drawn towards the rear end of the track.

7. A wrecking truck, comprising the combination of a motor vehicle chassis, an open body mounted thereon; standards mounted at opposite sides of said body adjacent the front end of the body; horizontally disposed booms pivotally mounted on said standards; extensible means for supporting the outer ends of said booms in any adjusted position; blocks suspended from the outer ends of said booms; means for raising and lowering said blocks; tracks disposed on the longitudinal axis of said body and extending beyond the rear end thereof, said tracks beyond said body sloping downwardly and rearwardly; cantilevers for supporting the outer ends of said tracks; a saddle mounted on the outer ends of said tracks; and a carriage movable on said tracks, and having a saddle thereon, for the purpose specified.

8. In a truck as set forth in claim 7, a pulley connected to the ends of said tracks; a transversely disposed shaft journaled on the body, a hand lever for rotating said shaft; and a cable passing around said pulley and having one end thereof attached to said carriage and the other end wrapped around said shaft, whereby as the latter is rotated the carriage will be drawn towards the rear ends of the tracks.

9. A wrecking truck, comprising the combination of a motor vehicle chassis; an open body mounted thereon; standards mounted at opposite sides of said body adjacent the front end thereof; horizontally disposed booms pivotally mounted on said standard and normally extending beyond the rear end of said body; extensible means for supporting the outer ends of said booms in any adjusted position; blocks suspended from the outer ends of said booms; means for raising and lowering said blocks; tracks disposed on the longitudinal axis of said body intermediate said booms and extending beyond the rear end thereof, the outer ends of said tracks beyond said body sloping downwardly and rearwardly; cantilevers for supporting the outer ends of said tracks; a saddle mounted on the outer ends of said tracks; and a carriage movable on said tracks, and having a saddle thereon, for the purpose specified.

10. In a truck as set forth in claim 9, a pulley connected to the ends of said track; a transversely disposed shaft journaled on the body, a hand lever for rotating said shaft; and a cable passing around said pulley and having one end thereof attached to said carriage and the other end wrapped around said shaft, whereby as the latter is rotated the carriage will be drawn towards the rear end of the track.

11. In combination with a vehicle, a boom mounted thereon; a block and tackle suspended from said boom; a track in the vehicle body; a carriage movable on said track; and means for moving said carriage towards the outer end of said track.

12. In combination with a vehicle, a plurality of booms mounted thereon; blocks and tackles suspended from said booms; a track in the vehicle body; a carriage movable on said track; and means for moving said carriage towards the outer end of said track.

13. In combination with a vehicle, a plurality of booms mounted thereon; blocks and tackles suspended from said booms; a track in the vehicle body extending beyond the rear end thereof; a carriage movable on said track; and means for moving said carriage towards the outer end of said track.

14. In combination with a motor vehicle having an open body; a boom mounted thereon and extending beyond the rear end of the body; a block and tackle suspended from said boom; a track in said body extending beyond the rear end thereof, means on said body for supporting the outer end of said track; a carriage movable on said track; and means for moving the carriage towards the outer end of said track.

15. In combination with a motor vehicle having an open body; a plurality of booms pivotally mounted thereon and adapted to extend beyond the rear end of the body; blocks suspended from said booms; means for raising and lowering said blocks; a track in said body extending beyond the rear end thereof, said track beyond the body sloping downwardly and rearwardly; a carriage movable on said track; and means for moving the carriage towards the outer end of said track.

16. In combination with a motor vehicle having an open body; a plurality of booms pivotally mounted thereon and adapted to extend beyond the rear end of the body; blocks suspended from said booms; means for raising and lowering said blocks; a track in said body extending beyond the rear end thereof, said track beyond the body sloping downwardly and rearwardly; means on said body for supporting the outer end of said track; a carriage movable on said track; and means for moving the carriage to the outer end of said track.

17. In combination with a motor vehicle having an open body; a plurality of booms pivotally mounted thereon and adapted to extend beyond the rear end of the body; blocks suspended from said booms; power means for raising and lowering said blocks; a track in said body extending beyond the rear end thereof, said track beyond the body sloping downwardly and rearwardly; cantilever means on said body for supporting the outer end of said track; a carriage movable on said tracks; and means for moving the carriage on said track.

18. In combination with a vehicle, a track in the vehicle body; a carriage movable on said track; a pulley at the outer end of the track; a rotatable shaft journaled in the body; and a cable passing around said pulley and having one end attached to the carriage and the other end wrapped around the shaft, whereby as the shaft is rotated the carriage will be drawn towards the rear end of the track.

19. In combination with a vehicle having an open body; a track in said body extending beyond the rear end thereof, said track beyond the body sloping downwardly and rearwardly; means on said body for supporting the outer end of said track; a carriage movable on said track; a pulley at the rear end of said track; a rotatable shaft journaled in the body, and a cable passing around the pulley and having its ends respectively engaging the carriage and shaft, whereby the carriage will be moved towards the rear end of the track as the shaft is rotated.

In testimony that I claim the foregoing as my own, I affix my signature.

JOHN J. PALOTCE.